United States Patent [19]

Aruga

[11] Patent Number: 4,995,702
[45] Date of Patent: Feb. 26, 1991

[54] PROJECTION-TYPE DISPLAY DEVICE

[75] Inventor: Shuji Aruga, Nagano, Japan

[73] Assignee: Seiko Epson Corporation, Tokyo, Japan

[21] Appl. No.: 114,996

[22] Filed: Oct. 30, 1987

[30] Foreign Application Priority Data

Oct. 31, 1986 [JP] Japan ................ 61-260253
Dec. 23, 1986 [JP] Japan ................ 61-307282
Dec. 23, 1986 [JP] Japan ................ 61-307283
Jul. 21, 1987 [JP] Japan ................ 62-181333

[51] Int. Cl.$^5$ .............................. G02F 1/13
[52] U.S. Cl. ................ 350/331 R; 350/339 F; 350/334; 350/347 R; 350/379; 350/174
[58] Field of Search ................ 350/174, 173, 331 R, 350/337, 339 F, 333, 408, 401, 402, 334, 347 R, 379

[56] References Cited

U.S. PATENT DOCUMENTS

| 3,588,324 | 6/1971 | Marie .............................. 350/408 X |
| 3,838,906 | 10/1974 | Kumada ......................... 350/389 X |
| 4,368,963 | 1/1983 | Stolov et al. .................... 350/331 R |
| 4,425,028 | 1/1984 | Gagnon ............................ 350/337 |
| 4,448,491 | 5/1984 | Okubo ............................ 350/333 X |
| 4,632,514 | 12/1986 | Ogawa et al. ..................... 350/339 F |
| 4,652,088 | 3/1987 | Kando et al. ...................... 350/334 |
| 4,652,851 | 3/1987 | Lewin ............................ 350/331 R |
| 4,733,948 | 3/1988 | Kitahara ............................ 350/334 |
| 4,749,259 | 6/1988 | Ledebuhr ........................... 350/337 |
| 4,904,061 | 2/1990 | Aruga ............................ 350/339 F |

FOREIGN PATENT DOCUMENTS 0159831 8/1985 Japan .................. 350/339 F
61-150487 11/1986 Japan .
2153546 8/1985 United Kingdom ........... 350/174

OTHER PUBLICATIONS

The Use of the Hybrid Field Effect Mode Liquid Crystal Light Valve with Visible Spectrum Projection Light, by Bleha, et al., pp. 104–105, SID 77 Digest.
A New Color-TV Projector, by Jacobson, et al., pp. 106–107, SID 77 Digest.
Brody et al, "A 6×6 Inch 20 Lines-Per-Inch Liquid Crystal Display Panel", IEEE Trans. on Elec. Dev., vol. ED-20, No. 11, Nov. '73, pp. 995–1001.
Allan, "The Optimization of Twisted Nematic Display Thickness", Information Display Oct. 1983, pp. 14 & 16.

Primary Examiner—Stanley D. Miller
Assistant Examiner—Huy K. Mai
Attorney, Agent, or Firm—Blum Kaplan

[57] ABSTRACT

A projection-type display device using twisted nematic liquid crystal light valves in which the photoelectric transfer characteristics of three light valves for selectively transmitting red, green and blue light to a synthesizing device are matched. The product of the birefrigence Δn and thickness d of the twisted nematic liquid crystal and thickness of cell is selected to fall within a predetermined optimal range of values depending upon the wavelength of light which travels therethrough. The thickness d or birefrigence Δn of the twisted nematic liquid crystal material of each light valve may be the same.

18 Claims, 4 Drawing Sheets

PROJECTION-TYPE DISPLAY DEVICE

BACKGROUND OF THE INVENTION

This invention relates generally to a projection-type display device, and more particularly to a colored projection-type display device using liquid crystal light valves.

Conventional projection-type display devices which use liquid crystal light valves such as those disclosed in Japanese Laid Open Application Nos. 179723/85, 35481/86 and 150487/86 separate the image to be displayed initially into its red, green and blue wavelengths of light. Each of these wavelengths of light is then directed toward a corresponding light valve which permits or prevents transmission of the light therethrough. The red, green and blue wavelengths of light which are permitted to pass through these light valves are synthesized by additive color mixing using dichroic mirrors, a dichroic mirror prism or the like. The synthesized image is then projected onto a screen through a projection lens.

Each of the light valves has a twisted nematic mode (hereinafter referred to as "TN" mode) of operation which is driven by an active switching array. Such light valves provide an image having a high resolution and a high contrast ratio and can be driven at a low voltage. Projection-type display devices using liquid crystal light valves ar also considered highly desirable due to their compact size and light weight as compared to conventional projection-type display devices using cathode ray tubes.

The photoelectric transfer characteristics of projection-type display devices using liquid crystal light valves during its TN mode of operation are dependent upon the wavelengths of light incident thereto. Due to such dependency, conventional projection-type display devices using liquid crystal light valves exhibit undesirable colorations in the gray scale, and poor color purity and reproducibility. The thickness of each liquid crystal cell is carefully monitored during manufacture. Cells with slight variations in thickness are discarded resulting in low yields and higher manufacturing costs.

Accordingly, it is desirable to provide a projection-type display using liquid crystal light valves which produce an image having excellent gray scale, color reproducibility and color purity as well as high resolution and contrast ratio. It is also desirable to provide a method for manufacturing the liquid crystal light values which produces higher yields and thus reduces the manufacturing costs.

SUMMARY OF THE INVENTION

Generally speaking, in accordance with the invention, light representative of the image to be projected is directed toward a projection-type display device having three light valves. The first light valve includes a first twisted nematic liquid crystal cell having a birefrigence $\Delta n_1$ and a thickness $d_1$. The value of the product of $n_1 \times d_1$ is selected for controlling the red wavelength of the light. The second light valve includes a second twisted nematic liquid crystal cell having a birefrigence $\Delta n_2$ and a thickness $d_2$. The value of the product of $\Delta n_2 \times d_2$ is selected for controlling the green wavelength of the light. The third light valve includes a third twisted nematic liquid crystal cell having a birefrigence $\Delta n_3$ and a thickness $d_3$. The value of the product of $\Delta n_3 \times d_3$ is selected for controlling the blue wavelength of the light.

The device also includes a synthesizer for mixing the red, green and blue wavelengths of the light which are transmitted through the first, second and third light valves, respectively. The synthesizer can be a dichroic mirror prism having four right-angled prisms or three dichroic mirrors.

In one embodiment of the invention, the thicknesses of the three twisted nematic liquid crystal cells (i.e., $d_1$, $d_2$ and $d_3$) are equal. In another embodiment of the invention, the birefrigences of the three twisted nematic liquid crystal cells (i.e. $\Delta n_1$, $\Delta n_2$ and $\Delta n_3$) are equal. Additionally, the product of $\Delta n_1 \times d_1$ of the first light valve is greater than the product of $\Delta n_2 \times d_2$ of the second light valve which is greater than the product of $\Delta n_3 \times d_3$ of the third light valve.

Preferably, the value of the product of $\Delta n_1 \times d_1$ of the first light valve ranges between 1.4 and 1.6; the value of the product of $\Delta n_2 \times d_2$ of the second light valve ranges between 1.2 and 1.4; and the value of the product of $\Delta n_3 \times d_3$ of the third light valve ranges between 1.0 and 1.2.

Accordingly, it is an object of the invention to provide an improved projection-type display device using liquid crystal light valves and method of manufacture thereof which produces an image having excellent gray scale, color reproducibility and color purity.

Another object of the invention is to provide an improved method of manufacture for a projection-type display device using liquid crystal light valves which impose less restrictive manufacturing tolerances for the twisted nematic liquid crystal cell thickness resulting in higher yields and reduced manufacturing costs thereof.

Still other objects and advantages of the invention will in part be obvious and will in part be apparent from the specification.

The invention accordingly comprises the several steps and a relation of one or more of such steps with respect to each of the others, and the apparatus embodying features of construction, a combination of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

An image from a projection-type display device using three liquid crystal light valves having excellent gray scale, color reproducibility, and color purity can be obtained by substantially matching the photoelectric transfer characteristics of the three light valves. The three light valves are associated with and control the red, green and blue wavelengths of the image to be produced.

The most important factor directly affecting the photoelectric transfer characteristics of a twisted nematic liquid crystal light valve is the value of the function $\Delta n \times d / \lambda$ wherein $\Delta n$ and $d$ represent the birefringence and thickness of a twisted nematic liquid crystal cell, respectively, and $\lambda$ is the wavelength of the colored light incident to the twisted nematic liquid crystal cell. By approximately equalizing the function $\lambda n \times d / \lambda$ for each of the three light valves, the photoelectric transfer characteristics of each of the three light valves can be matched.

Red light has a larger wavelength than green light which has a larger wavelength than blue light. Therefore, in order to equalize the photoelectric characteristics of the three light valves, the product of birefringence $\Delta n_1$ and thickness $d_1$ for the light valve controlling red light (i.e., $\Delta n_1 \times d_1$) is greater than the product of birefringence $\Delta n_2$ and thickness $d_2$ of the light valve controlling green light (i.e., $\Delta n_2 \times d_2$) which is greater than the product of birefringence $\Delta n_3$ and thickness $d_3$ of the light valve controlling blue light (i.e., $\Delta n_3 \times d_3$). Mathematically this constraint is expressed as follows:

$$\Delta n_1 \times d_1 > \Delta n_2 \times d_2 > \Delta n_3 \times d_3 \quad \text{(eq. 1)}$$

A projection-type display device in which three light valves conform to eq. 1. can be produced at a low manufacturing cost by maintaining all three cells of the twisted nematic liquid crystal material at a constant thickness while varying each cell's birefringence $\Delta n$. The manufacture of such light valves is otherwise well known in the art and can be made using conventional techniques which do not involve additional steps.

Figure 3:
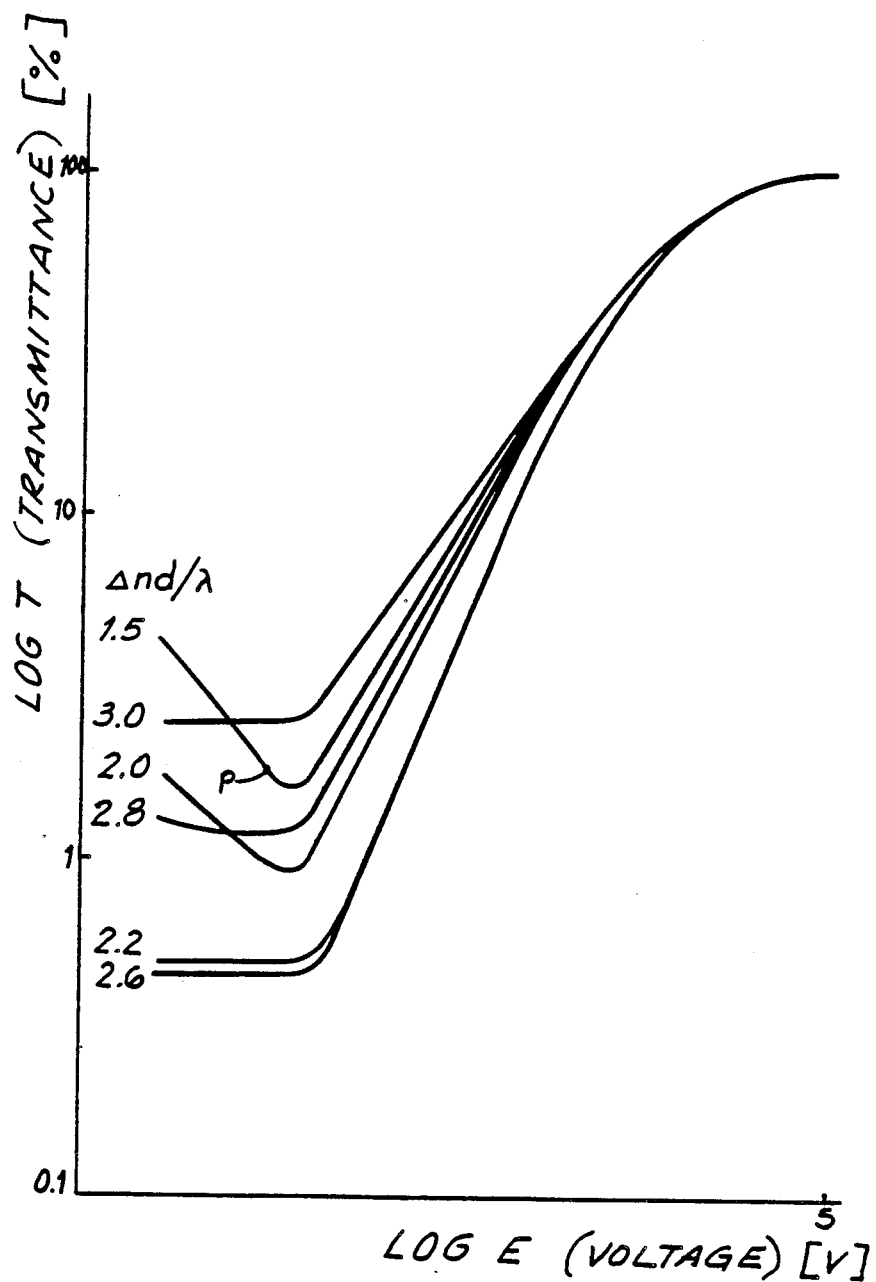
FIG. 3 is a graph of light transmittance versus voltage applied to the twisted nematic liquid crystal light valve illustrating the photoelectric transfer characteristics.

As shown in FIG. 3, the photoelectric transfer characteristics of light valves in which cells of twisted nematic liquid crystal material had twist angles of 90° or less exhibited the greatest linearity when the function $\Delta n \times d / \lambda$ was between 2.2 and 2.6. With the light valve shut off, the least amount of light transmitted therethrough occurred (i.e., the display from the light valve appeared blackest) when the function $\Delta n \times d / \lambda$ was also between 2.2 and 2.6. The transmittance values shown in FIG. 3 have been normalized so that when a voltage of five volts is applied across the light valve, a transmittance level of 100% is attained.

For values of the function $\Delta n \times d / \lambda$ equal to or less than 2.2, the linearity of the photoelectric transfer curve is substantially reduced with portions of the transmittance-voltage curve being inverted. For values of $\Delta n \times d / \lambda$ equal to or greater than 2.6, the dynamic range of the contrast ratio is reduced. Therefore, light valves in which function $\Delta n \times d / \lambda$ is between 2.2 and 2.6 provide the optimum photoelectric characteristics resulting in excellent color reproducibility and color purity and greatest contrast ratio.

Generally, the dominant wavelengths of red light ($\lambda_1$), green light ($\lambda_2$) and blue light ($\lambda_3$) are approximately 0.62 micrometers, 0.54 micrometers and 0.46 micrometers, respectively. To ensure that the photoelectric characteristics for the three light valves are matched and that each light valve has a value of $\Delta n \times d / \lambda$ between 2.2 and 2.6, the cells of twisted nematic liquid crystal material for controlling the red, green and blue wavelengths of light should have values of $\Delta n_1 \times d_1$, $\Delta n_2 \times d_2$ and $\Delta n_3 \times d_3$ between 1.4 and 1.6 microns, 1.2 and 1.4 microns, and 1.0 and 1.2 microns, respectively. Mathematically this may be expressed as:

$$1.4 < \Delta n_1 \times d_1 < 1.6 \text{ microns} \quad \text{(eq. 2)}$$

$$1.2 < \Delta n_2 \times d_2 < 1.4 \text{ microns} \quad \text{(eq. 3)}$$

$$1.0 < \Delta n_3 \times d_3 < 1.2 \text{ microns} \quad \text{(eq. 4)}$$

In one embodiment of the invention thicknesses $d_1$, $d_2$ and $d_3$ of the twisted nematic liquid crystal cells are substantially equal. Therefore, in matching the photoelectric characteristics of the three light valves, birefringence $\Delta n_1$ must be greater than birefringence $\Delta n_2$ which must be greater than birefringence $\Delta n_3$ (i.e., $\Delta n_1 > \Delta n_2 > \Delta n_3$). Similarly, in another embodiment, birefringences $\Delta n_1$, $\Delta n_2$ and $\Delta n_3$ of the twisted nematic liquid crystal cells are substantially equal. Therefore, in order to match the photoelectric characteristics of the three light valves, thickness $d_1$ is greater than thickness $d_2$ which is greater than thickness $d_3$ (i.e., $d_1 > d_2 > d_3$).

Examples 1-3, which now follow, are based on restricting the values of $\Delta n_1 \times d_1 / \lambda_1$, $\Delta n_2 \times d_2 / \lambda_2$ and $\Delta n_3 \times d_3 / \lambda_3$ between 2.2 and 2.6.

EXAMPLE 1

Figure 1:
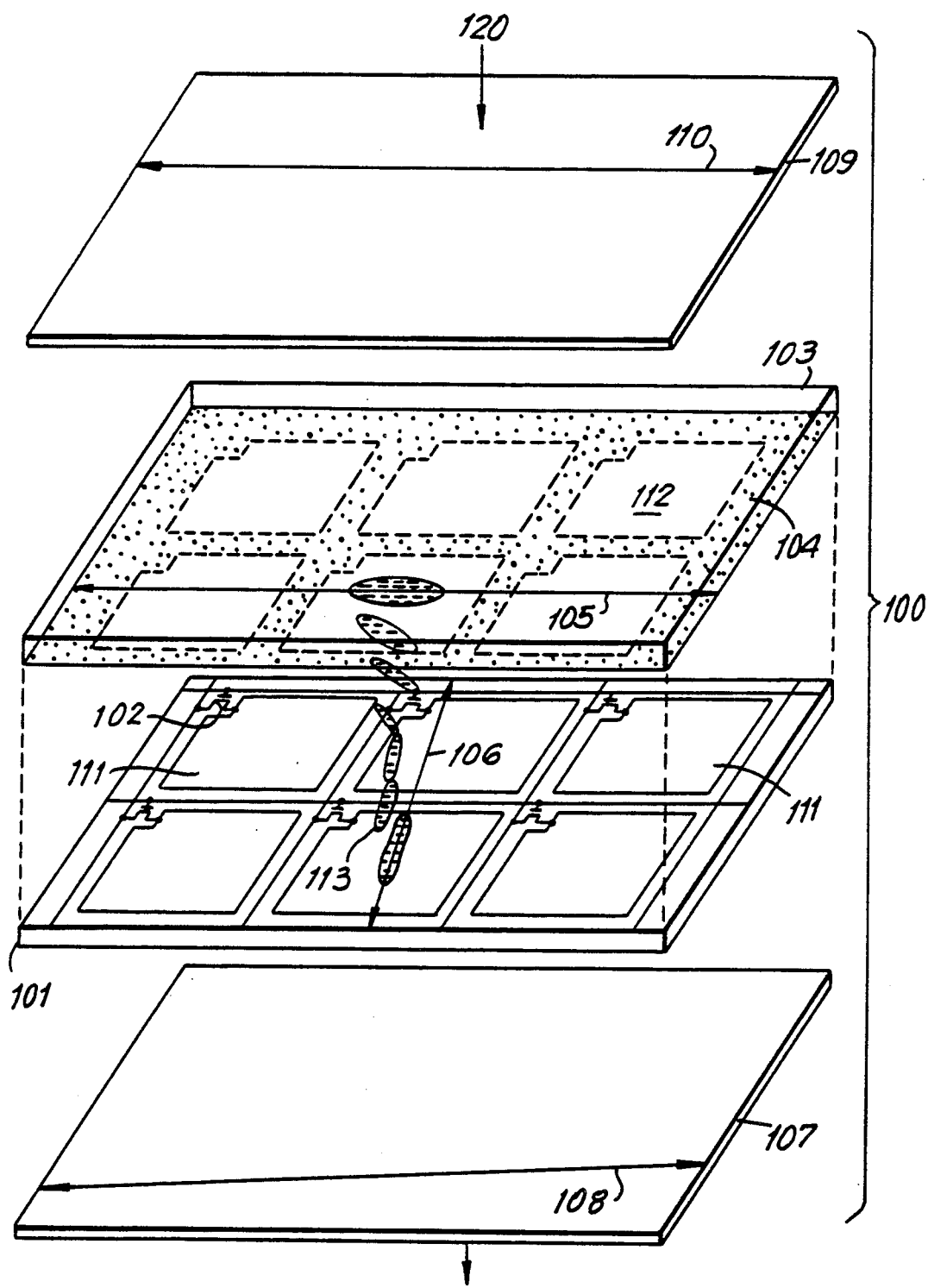
FIG. 1 is an exploded perspective view of a twisted nematic liquid crystal light valve in accordance with one embodiment of the invention.

Referring now to FIG. 1, a twisted nematic liquid crystal light valve 100 includes a lower transparent substrate 101 having driving circuitry 102 such as a matrix array of polysilicon thin film transistors (TFT) formed on the interior surface of lower substrate 101 coupled to an array of liquid crystal driving electrodes 111. An upper transparent substrate 103 includes a light shielding layer 104 disposed on the interior surface of substrate 103 having a plurality of openings 112 corresponding to driving electrodes 111. Light shielding layer 104 shields at least the TFT portions of driving circuit 102 on lower substrate 101. Driving circuitry 102 turns light valve 100 on and off. In this example polysilicon TFT is used. However, other suitable materials for driving circuitry 102 can be used such as, but not limited to, amorphous silicon TFT, compound semiconductor TFT, elements with two terminals utilizing diode characteristics, such as a ring diode and metal-insulator metal (MIM), or simple matrix driving. An organic polymer film is disposed on the interior surfaces of both substrates 101 and 103 as liquid crystal aligning layers. Aligning is performed so that the liquid crystal molecules will be aligned along the direction of an axis 105 on upper substrate 103 and axis 106 on lower substrate 101. The angle of twist between axes 105 and 106 is about 80 degrees.

Lower transparent substrate 101 and upper transparent substrate 102 are spaced apart by spherical spacers (not shown) to form a space therebetween. A twisted nematic liquid crystal composition 113 is placed in the space between substrates 101 and 103.

A lower polarizer 107 having an axis of polarization 108 is disposed on the exterior surface of lower substrate 101 and an upper polarizer 109 having an axis of polarization 110 is disposed on the exterior surface of upper substrate 103. In the preferred embodiment, axes of polarization 108 and 110 are disposed at approximately 90 degrees to each other although shown in FIG. 1 as approximately 180°.

Three twisted nematic liquid crystal light valves, of the type illustrated, were fabricated using spherical spacers to provide thicknesses of 5 micrometers, 6 micrometers and 7 micrometers. The liquid crystal material in each cell had a birefrigence $\Delta n$ equal to 0.22. Accordingly, the first of these three light valves had a product of its birefrigence $\Delta n$ and thickness d (i.e., $\Delta n \times d$) equal to 1.54 microns which was used for controlling the red wavelength of light. The second of these three light valves had a product of its birefrigence $\Delta n$ and thickness d (i.e., $\Delta n \times d$) equal to 1.32 microns which was used for controlling the green wavelength of light. The third of these three light valves had the product of its birefrigence $\Delta n$ and thickness d (i.e., $\Delta n \times d$) equal to 1.1 microns which was used for controlling the blue wavelength of light. Other values for $\Delta n \times d$ for each of the three light valves also can be used. The only limitations are those imposed by eqs. 2, 3 and 4. Furthermore, if the values of $\Delta n \times d$ for the three light valves conform to only two of the three eqs. 2, 3 and 4, the halftone colors of the image produced will still be better than prior art projection-type display devices which use twisted nematic liquid crystal light valves.

As light 120 travels through light valve 100 from the top, it first impinges polarizer 109 and is polarized by polarizing axis 110. The polarized light then passes through openings 112 of shielding layer 104 on substrate 103 and is rotated by liquid crystal material 113 to become parallel to orientation axis 106 on substrate 101 when driving electrode 111 is in the OFF state Since the reoriented polarized light exiting substrate 101 is substantially perpendicular to polarizing axis 108 of polarizer 107, light will not pass through polarizer 107. When driving circuitry 102 is turned on, however, liquid crystal material 113 is reoriented so as to be substantially parallel to orientation axis 105. Consequently, the plane of polarized light is not twisted and substantially all light 120 entering light valve 100 passes therethrough.

The foregoing operation of light valve 100 is based on rotation of polarized light as it passes through liquid crystal material 113. If the axes of polarization are oriented in parallel, light will be transmitted through the light valve when in the OFF state.

Figure 2:
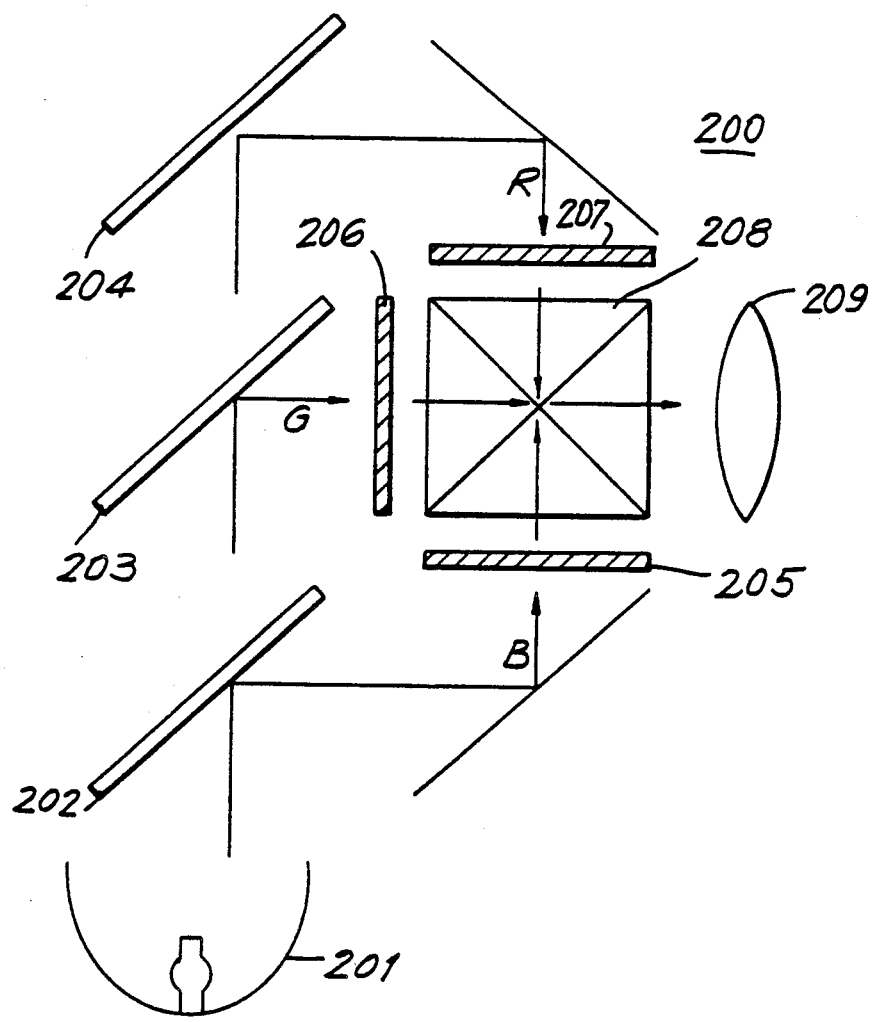
FIG. 2 is a diagrammatic top plan view of a projection type display device.

A projection-type display device 200, constructed and arranged in accordance with the invention, is shown in FIG. 2. White light from a light source 201 is directed toward a first dichroic mirror 202, a second dichroic mirror 203, and a third dichroic mirror 204 which reflect the blue wavelength, green wavelength and red wavelength of the white light, respectively. The blue wavelength, green wavelength and red wavelength of white light reflected by dichroic mirrors 202, 203 and 204 are directed toward twisted nematic liquid crystal light valves 205, 206 and 207, respectively.

The light valves 205, 206 and 207 are each similar in construction to light valve 100. Each of light valves 205, 206, and 207 have a different $\Delta n \times d$ which is specifically selected for controlling the wavelength of light traveling therethrough. Light valve 205 has a value of $\Delta n_3 \times d_3$ between 1.0 and 1.2. Light valve 206 has a value of $\Delta n_2 \times d_2$ between 1.2 and 1.4. Light valve 207 has a value of $\Delta n_1 \times d_1$ between 1.4 and 1.6 microns. The light passing through each of these light valves is synthesized by a synthesizer, such as a dichroic mirror prism 208. Dichroic mirror prism 208 includes four right-angle prisms; the dichroic mirror being on the perpendicular surface of each prism. The synthesized red, blue and green wavelengths of light representing the image are directed from prism 208 toward a lens 209 for focusing the synthesized images towards a screen (not shown). Other suitable synthesizers 208 instead of dichroic mirror prism 208 can be used and include, but are not limited to, three dichroic mirrors similar to mirrors 202 203 and 204.

Figure 4:
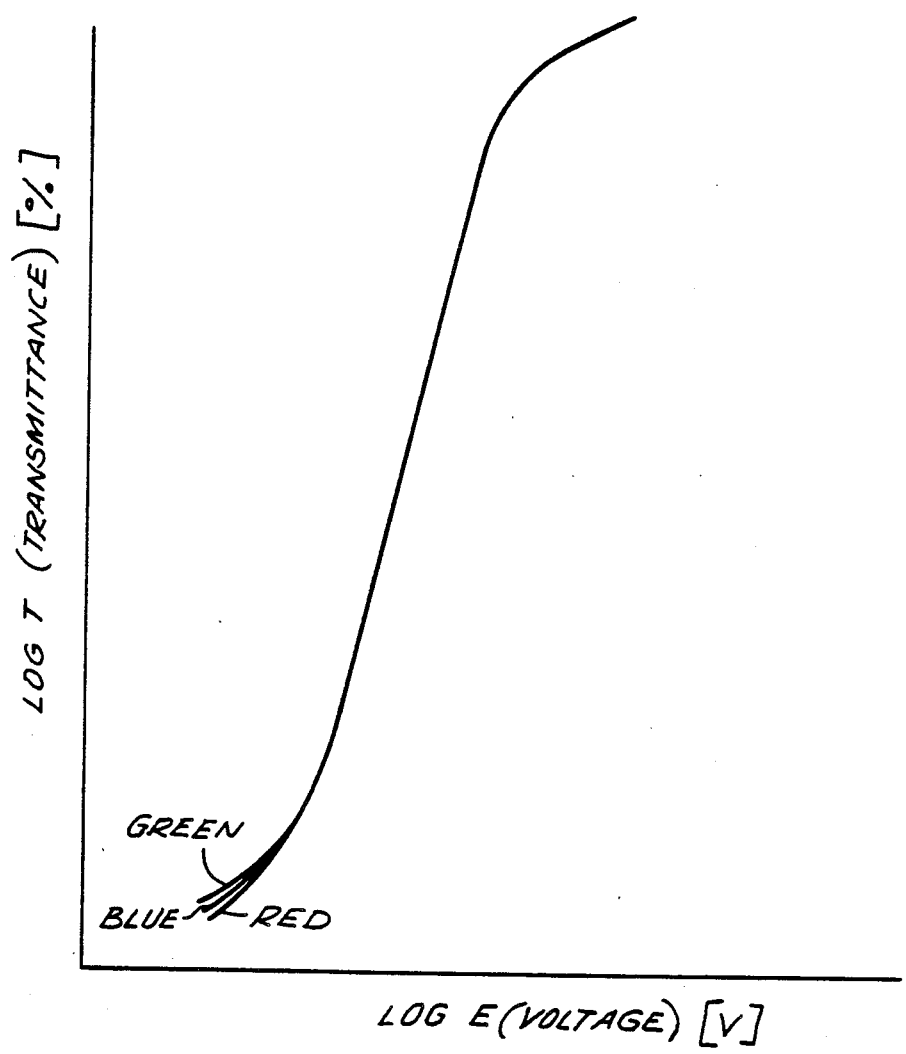
FIG. 4 is a graph of light transmittance versus voltage applied to the projection-type display device illustrating the photoelectric transfer characteristics.

FIG. 4 illustrates the photoelectric transfer characteristics of the red, green and blue wavelengths of light which form the image displayed by device 200. The photoelectric transfer characteristics of each of these primary colors is approximately the same since the product of $\Delta n \times d$ for each light valve is selected for controlling only that wavelength of light passing therethrough. In other words, the photoelectric transfer characteristic of each light valve has a value ranging between 2.2 and 2.6. Consequently, the photoelectric transfer characteristics of device 200 has excellent linearity. Furthermore, a very low black level (i.e., absence of light transmitted through light values 205, 206 and 207) can be obtained with no inversion of gray scale as shown in FIG. 3. As used herein, inversion of gray scale means that portion of the transmittance-voltage curve where the transmittance level decreases as the voltage level increases such as represented by point P on the curve having a $\Delta n \times d/\lambda$ of 1.5. Device 200 also provides neutral halftone displays which vary very little in color and produces high contrast images. The projected image displayed by device 200 also has excellent color reproducibility.

As compared to prior art projection-type display devices using light valves, device 200 also significantly improves the color reproducibility in the black regions of the image due to the low transmittance levels obtained using light valves 205, 206 and 207.

EXAMPLE 2

Referring once again to FIGS. 1, 2 and 4, light valves 205, 206 and 207 no longer have cells of twisted nematic liquid material 113 of different thicknesses with the same birefrigence. Rather, each of the three cells of twisted nematic liquid crystal material 113 is filled under vacuum with a different birefrigence $\Delta n$ but with an equal thickness. More specifically, each cell has the same thickness d equal to 7 micrometers. The cells of twisted nematic liquid crystal material 113 of light valves 205, 206 and 207, however, have birefrigences $\Delta n_3$, $\Delta n_2$ and $\Delta n_1$ of approximately 0.165, 0.19 and 0.215, respectively. The value of birefrigence $\Delta n$ and thickness d are not limited to the above values and are constrained only by eqs. 2, 3 and 4. Furthermore, if only two of the three light valves have cells conforming to two of the three eqs. 2, 3 and 4, the halftone color of the image produced by device 200 will nevertheless be better than the prior art projection-type display devices using twisted nematic liquid crystal material.

The construction of device 200 is otherwise the same as in Example 1. Accordingly, the photoelectric characteristics of device 200 show excellent linearity for the red, green and blue wavelengths of the image displayed. The neutral halftone display, color reproducibility and contrast ratio also are excellent.

Both Example 1 and Example 2 provide images in which color reproducibility are equal to those produced by projection-type display devices using cathode ray tubes. Since each of the light valves in Example 2 has the same thickness d, the manufacturing process for producing each light valve is the same, resulting in a reduction in the manufacturing cost for producing light valves 205, 206 and 207 as compared to Example 1.

Advantageously, the manufacturing tolerances for each liquid crystal light valve is not as restrictive as in the prior art. The manufacturing tolerances for thicknesses are less restrictive because the birefrigence $\Delta n$ of the cell can be modified in order to conform to eqs. 2, 3 and 4. Accordingly, an inadvertent variation in the thickness of the liquid crystal cell can be overcome and corrected by varying the birefrigence $\Delta n$ of the liquid crystal material in the cell. For instance, if the liquid crystal cell thickness d for light valve 207 is 8 micrometers rather than 7 micrometers, a liquid crystal material having a birefrigence $\Delta n$ of 0.187 rather than 0.215 would be used in order to conform to eq. 2. Therefore, many more light valves in which the cell thicknesses would be considered defective in the prior art are acceptable for preparing the display devices in accordance with the invention. A higher manufacturing yield of light valves results which results in an overall lower manufacturing cost.

By initially establishing the values of birefrigence $\Delta n$ and thickness d for each liquid crystal cell, the viscosity and threshold voltage for turning the light valves on and off can be immediately determined so that no subsequent correction of driving voltage is necessary. The response speed of light valves 205, 206 and 207 is also substantially the same.

The liquid crystal material suitable for use in the liquid crystal panels may be any twisted nematic liquid crystal having the desired birefrigence and viscosity characteristics. Typically mixtures including a liquid crystal compound having triple bonding in the molecular structure are utilized, such as the Tolan series, phenylcyclohexane (PCH) series or the pyrimidine series. The Tolan series include liquid crystal compounds a follows:

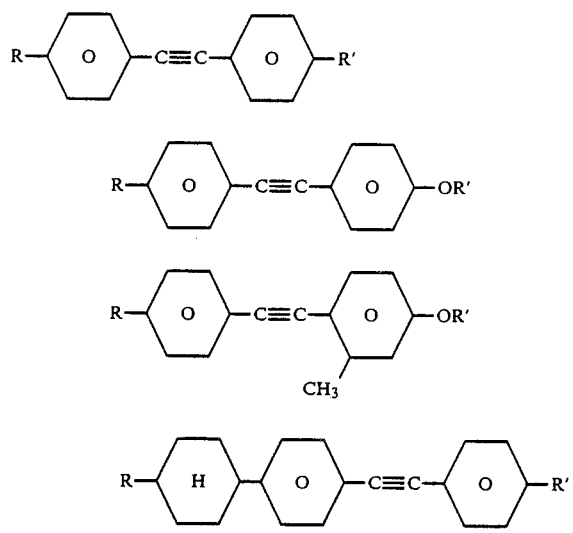

wherein R and R' are the same or different and are selected from hydrogen and alkyl groups having from 1 to 10 carbon atoms. These liquid crystal materials are desirable because they result in a greater increase in the response speed than any other type of liquid crystal material.

EXAMPLE 3

Figure 5:
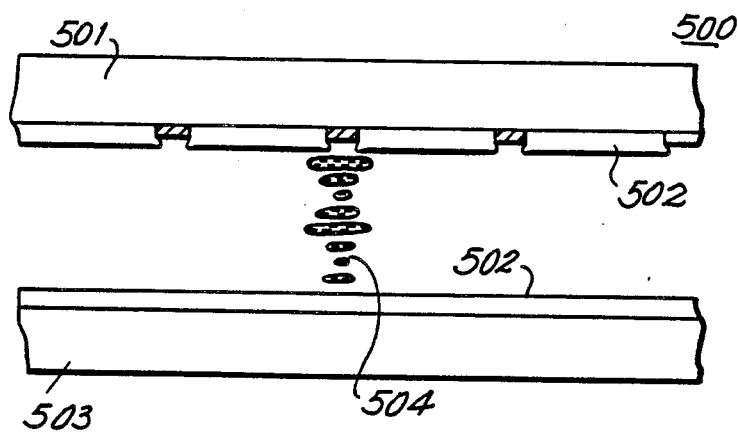
FIG. 5 is a cross-sectional view of a twisted nematic liquid crystal light valve in accordance with another embodiment of the invention.

A projection device 200 is constructed similar to Example 1, except that light valves 205, 206 and 207 are replaced by a light valve 500 as shown in FIG. 5. Light valve 500 is a simple matrix panel in which a plurality of stripe-type transparent electrodes 502 are formed on an upper transparent substrate 501 and a lower transparent substrate 503. Substrates 501 and 503 are spaced apart from each other with twisted nematic liquid crystal material 504 therebetween.

Aligning layers of organic molecule film (not shown) are formed on upper substrate 501 and lower substrate 503. The angle between the aligning layer and optical activity agent is approximately 210 degrees. The liquid crystal cell thickness is approximately 6 micrometers. The birefrigence $\Delta n$ of liquid crystal material 504 varies depending on whether light valve 500 is to be used for controlling the red, green or blue wavelengths of light. Light valve 500 is filled with nematic liquid crystal material 504 having birefrigences $\Delta n$ of 0.165, 0.15 and 0.12 when used for controlling the red, green and blue wavelengths of light, respectively. When device 200 includes light valve 500, it produces neutral halftones and provides excellent color reproducibility.

Twisted nematic display characteristics with twisted nematic angles of 90 degrees or greater are particularly dependent on the photoelectric transfer characteristics ($\Delta n \times d / \lambda$). Nevertheless, since $\Delta n \times d$ is selected according to the wavelength of light which the light valve is to control, the photoelectric characteristics required by the invention can be met for cells of nematic liquid crystal material 113 with twist angles of 90 degrees or greater.

As can now be readily appreciated, projection-type display device 200 produces excellent neutral halftones and has excellent color reproducibility due to matching the photoelectric transfer characteristics of each of the three light valves. Additionally, projection device 200 provides a much truer black level of the image. Device 200 also minimizes any inversion of the gray scale by optimizing $\Delta n \times d$ for each of the three light valves 205, 206 and 207. Each of the three twisted nematic liquid crystal light valves 205, 206 and 207 can be manufactured using the same process. No additional and/or complicated steps are required in manufacturing projection device 200. Furthermore, variation in the cell thickness of each light valve does not adversely affect the photoelectric characteristics of device 200 provided $\Delta n_1 \times d_1$ is between 1.4 and 1.6 microns; $\Delta n_2 \times d_2$ is between 1.2 and 1.4 microns and $\Delta n_3 \times d_3$ is between 1.0 and 1.2 microns. Consequently, a higher yield of light valves is provided resulting in lower manufacturing costs.

It will thus be seen that the objects set forth above, and those made apparent from the preceding description, are efficiently attained and, since certain changes may be made in the above method and construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which, as a matter of language, might be said to fall therebetween.

What is claimed is:

1. A projection-type display device in which light representative of the image to be projected is produced by a plurality of light valves, comprising:

a first light valve having a first twisted nematic liquid crystal cell with a birefringence $\Delta n_1$ and a thickness $d_1$, the value of $\Delta n_1$ being selected for controlling the red wavelength of light incident thereto;

a second light value having a second twisted nematic liquid crystal cell with a birefringence $\Delta n_2$ and a thickness $d_2$, the value of $\Delta n_2$ being selected for controlling the green wavelength of light incident thereto;

a third light valve having a third twisted nematic liquid crystal cell with a birefringence $\Delta n_3$ and a thickness $d_3$, the value of $\Delta n_3$ being selected for controlling the blue wavelength of light incident thereto; and synthesizing means for adding the red, green and blue wavelengths of light transmitted through the respective first, second and third light valves prior to projection by the device;

wherein the values of $\Delta n_1$, $\Delta n_2$ and $\Delta n_3$ are unequal.

2. The projection-type display device of claim 1, in which $\Delta n_1 \times d_1/\lambda_1$ for the first light valve, $\Delta n_2 \times d_2/\lambda_2$ for the second light valve and $\Delta n_3 \times d_3/\lambda_3$ for the third light valve each have values between 2.2 and 2.6 wherein $\lambda_1$, $\lambda_2$ and $\lambda_3$ represent the red wavelength, green wavelength and blue wavelength, respectively.

3. The projection type display device of claim 2, where $\Delta n_1 \times d_1/\lambda_1 = \Delta n_2 \times d_2/\lambda_2 = \Delta n_3 \times d_3/\lambda_3$.

4. The projection-type display device of claim 2, value of $\Delta n_1 \times d_1$ is greater than the value of $\Delta n_2 \times d_2$ is greater than the value of $\Delta n_3 \times d_3$.

5. The projection-type display device of claim 4, wherein $\Delta n_1 \times d_1$ has a value between 1.4 and 1.6 microns, $\Delta n_2 \times d_2$ has a value between 1.2 and 1.4 microns and $\Delta n_3 \times d_3$ has a value between 1.0 and 1.2 microns.

6. The projection-type display device of claim 1, wherein the thicknesses $d_1$, $d_2$ and $d_3$ are substantially equal.

7. The projection-type display device of claim 1 wherein each light valve includes a pair of transparent substrates spaced apart having a thin film transistor formed on the interior surface of one of the substrates and a light shielding layer formed on the interior surface of the other of the substrates.

8. The projection-type display device of claim 7, wherein the thin film transistor is selected from the group consisting of polysilicon, amorphous silicon and compound semiconductor.

9. The projection-type display device of claim 7, further including a pair of polarizers, each polarizer disposed adjacent to and on the exterior surface of one of the substrates.

10. The projection-type display device of claim 1, in which each of the light valves includes a pair of stripe-type transparent electrodes.

11. The projection-type display device of claim 1, wherein $\Delta n_1 > \Delta n_2 > n_3$.

12. A method of manufacturing a projection-type display device having three light valves comprising:

producing a first liquid crystal cell serving as a first light valve having a first twisted nematic liquid crystal material with a birefringence $\Delta n_1$ and a thickness $d_1$;

producing a second liquid crystal cell serving as a second light valve having second twisted nematic liquid crystal material with a birefringence $\Delta n_2$ and a thickness $d_2$;

producing a third liquid crystal cell serving as a third light valve having a third twisted nematic liquid crystal material with a birefringence $\Delta n_3$ and a thickness $d_3$; and producing a synthesizer for adding the wavelengths of light produced by the first, second and third light valves;

wherein the value of $\Delta n_1$ is greater than the value of $\Delta n_2$ is greater than the value of $\Delta n_3$.

13. The method of claim 12, wherein the light valves are produced such that $\Delta n_1 \times d_1$ has a value between 1.4 microns and 1.6 microns, $\Delta n_2 \times d_2$ has a value between 1.2 and 1.4, and $\Delta n_3 \times d_3$ has a value between 1.0 and 1.2 microns.

14. The method of claim 12, further including the step of manufacturing each light valve with twisted nematic liquid crystal material of the same thickness.

15. A method of manufacturing a projection-type display having three light valves comprising:

producing a first liquid crystal cell serving as a first light valve having first twisted nematic liquid crystal material with a first birefringence;

producing a second liquid crystal cell serving as a second light valve having second twisted nematic liquid crystal material with a second birefringence;

producing a third liquid crystal cell serving as a third light valve having a third twisted nematic liquid crystal material with a third birefringence;

wherein each of the light valves has twisted nematic liquid crystal material of the same birefringence.

16. A method of projecting an image, comprising:

projecting light from a light source towards color separating means for separating the image into red, green and blue components;

directing each of the red, green and blue components toward a different one of three transparent twisted nematic liquid crystal light valves, each light valve having a birefringence $\Delta n$ and a thickness $d$ for controlling the respective light component incident thereto, a different value of birefringence $\Delta n$ than the value of birefringence $\Delta n$ of each of the other two light valves and having a product of birefringence $\Delta n$ and thickness $d$ which is constant throughout the light valve; and selectively transmitting the red, blue and green components through the light valves to synthesizing means for combining the red, green and blue components to form the desired image prior to projecting the image blue components to form the desired image and projecting the image.

17. The method of claim 16, wherein the first light valve is selected to have a first twisted nematic liquid crystal with a birefrigence $\Delta n_1$ and a thickness $d_1$, the value of the product $\Delta n_1 \times d_1$ is selected for controlling the red wavelength of light incident thereto;

the second light valve is selected to have a second twisted nematic liquid crystal with a birefrigence $\Delta n_2$ and a thickness $d_2$, the value of the product $\Delta n_2 \times d_2$ is selected for controlling the green wavelength of light incident thereto; and the third light valve is selected to have a third twisted nematic liquid crystal with a birefrigence $\Delta n_3$ and a thickness $d_3$, the value of the product $\Delta n_3 \times d_3$ is selected for controlling the blue wavelength of light incident thereto.

18. The method of claim 17 wherein the thicknesses $d_1$, $d_2$ and $d_3$ are substantially equal.